United States Patent
Johannsen et al.

(10) Patent No.: US 6,456,202 B2
(45) Date of Patent: Sep. 24, 2002

(54) SYSTEM FOR MONITORING THE STATUS OF A WATER SOFTENER

(75) Inventors: James Johannsen, Minnetonka; Jeffrey A. Zimmerman, Blaine, both of MN (US)

(73) Assignee: Ecowater Systems, Inc., Woodbury, MN (US)

( * ) Notice: Subject to any disclaimer, the term of this patent is extended or adjusted under 35 U.S.C. 154(b) by 0 days.

(21) Appl. No.: 09/833,991

(22) Filed: Apr. 12, 2001

Related U.S. Application Data
(60) Provisional application No. 60/198,965, filed on Apr. 21, 2000.

(51) Int. Cl.$^7$ .............................................. G08B 21/00
(52) U.S. Cl. ........................ 340/623; 340/612; 340/618
(58) Field of Search ........................... 340/539, 573.6, 340/603, 618, 619, 620, 870.02, 870.09, 870.16, 623, 612; 210/96.1, 140, 143, 662; 116/228

(56) References Cited

U.S. PATENT DOCUMENTS

| | | | |
|---|---|---|---|
| 2,731,622 A | 1/1956 | Doremus et al. | 340/295 |
| 3,312,965 A | 4/1967 | Ward | 340/870.07 |
| 3,500,377 A | 3/1970 | Muehter | 340/287 |
| 3,854,122 A | 12/1974 | Cross | 340/870.07 |
| 3,897,213 A | 7/1975 | Stevens et al. | 210/656 |
| 4,246,101 A | 1/1981 | Selby, III | 210/615 |
| 4,275,448 A | 6/1981 | Le Dall | 210/662 |
| 4,320,010 A | 3/1982 | Tucci et al. | 210/662 |
| 4,722,797 A | 2/1988 | Gauer et al. | 210/662 |
| 4,737,770 A | 4/1988 | Brunius et al. | 340/539 |
| 4,830,757 A | 5/1989 | Lynch et al. | 210/742 |
| 4,893,332 A * | 1/1990 | Brown | 340/870.02 |
| 4,917,794 A | 4/1990 | Fettes et al. | 210/96.1 |
| 5,057,212 A | 10/1991 | Burrows | 210/85 |
| 5,087,883 A | 2/1992 | Hoffman | 324/443 |
| 5,145,575 A | 9/1992 | Burrows | 210/85 |
| 5,234,601 A | 8/1993 | Janke et al. | 210/662 |
| 5,239,285 A * | 8/1993 | Rak | 340/623 |
| 5,363,087 A | 11/1994 | Johannsen et al. | 340/612 |
| 5,416,466 A | 5/1995 | Malvaso et al. | 340/539 |
| 5,422,626 A | 6/1995 | Fish | 340/539 |
| 5,612,684 A | 3/1997 | Kelly et al. | 340/870.31 |
| 5,617,084 A * | 4/1997 | Sears | 340/870.02 |
| 5,663,716 A | 9/1997 | Miwa et al. | 340/2.4 |
| 5,781,143 A | 7/1998 | Rossin | 340/539 |
| 5,862,225 A | 1/1999 | Feldman et al. | 380/274 |

\* cited by examiner

Primary Examiner—Van Trieu
(74) Attorney, Agent, or Firm—Piper Hudnick

(57) ABSTRACT

A system is provided for monitoring the status of a water softener at a remote location. The system includes a water softener controller with a control processing unit for determining the status of the water softener. The system also includes a water softener transmitter and a water softener indicator. The transmitter is coupled to the controller and transmits the status of the water softener to the indicator. The water softener indicator receives and displays the status message. The system is capable of determining whether the water softener is operating normally, whether the salt level is low or whether the water softener needs servicing.

12 Claims, 3 Drawing Sheets

SYSTEM FOR MONITORING THE STATUS OF A WATER SOFTENER

This application claims priority from provisional application Ser. No. 60/198,965, filed Apr. 21, 2000.

BACKGROUND OF THE INVENTION

The invention relates, generally, to water softeners and, more particularly, to systems for monitoring the status of water softeners.

Domestic water softeners remove hardness from raw water by passing it through a tank containing a liquid treatment medium bed, typically formed of resin beads. A salt solution, that is brine, is passed through the resin bed to restore its softening capacity. The brine is formed in a container which is connected by a liquid flow passage to the tank containing the resin beads. The flow of liquid through the liquid flow passage is regulated by a control valve which is actuated by an electronic regeneration control circuit.

Salt, typically in the form of chunks or pellets, is placed in the container. Under the control of the electronic regeneration control circuit, the control valve allows a predetermined amount of water to enter the container. Provided enough salt is present, the water and salt form a saturated salt solution, or brine, which is the regenerant for the resin bed. Again, under the control of the electronic regeneration control circuit, the control valve is actuated to cause the brine to be withdrawn from the container and circulated through, and thereby regenerate, the resin in the tank.

The amount of salt remaining in the container is reduced each time a portion of the salt is dissolved to form a regenerant. The supply of salt will become exhausted after a number of regeneration cycles, unless additional salt is placed in the container. Such that the salt supply will not become exhausted, it is desirable to provide some type of alarm to indicate that the salt supply is close to being exhausted. Such an alarm may be formed as a part of the electronic regeneration control circuit.

U.S. Pat. No. 5,363,087 is assigned to the instant assignee and discloses an example of an apparatus which detects a low level of salt and generates a corresponding low salt level alarm and is incorporated herein by reference. U.S. Pat. No. 5,363,087 discloses an apparatus for providing a regeneration solution to a regenerable liquid treatment medium bed including an electronic regeneration control circuit for controlling the regeneration of a liquid treatment medium bed with regenerant solution formed in a container by dissolving a quantity of solid material in a liquid. The container in which the regenerant solution is formed is provided with indicia spaced apart in a vertical direction. The indicia are observable with respect to the top surface of the quantity of solid material received in the container. An electronic control circuit includes a manual input means for entering the amount of solid material available in the container in terms of the observed indicia most closely corresponding to the top surface of the solid material. The electronic control circuit includes means for electronically reducing, each time a quantity of regenerant solution is used to regenerate the liquid treatment medium, the electronically stored indication of the amount of solid material remaining in the container. The apparatus includes an alarm means which is actuated to provide an alarm when the electronically stored indication of the amount of solid material remaining in the container is less than a predetermined minimum amount.

The prior art systems require the user to observe the display panel located on the water softener. However, the water softener may not be conveniently located near the user. Thus it is desirable to provide a remote water softener indicator located at a convenient location for the user.

SUMMARY OF THE INVENTION

Accordingly, the present invention provides a system for monitoring the status of a water softener. The system includes a water softener and a water softener controller with a means for determining the status of the water softener. The system also includes a water softener transmitter that is coupled to the water softener controller. The water softener transmitter transmits the status of the water softener to a water softener status indicator. The water softener status indicator receives and displays the status message. The system is capable of determining whether the water softener is operating normally, whether the salt level is low or whether the water softener needs servicing.

DETAILED DESCRIPTION OF THE INVENTION

Figure 1:
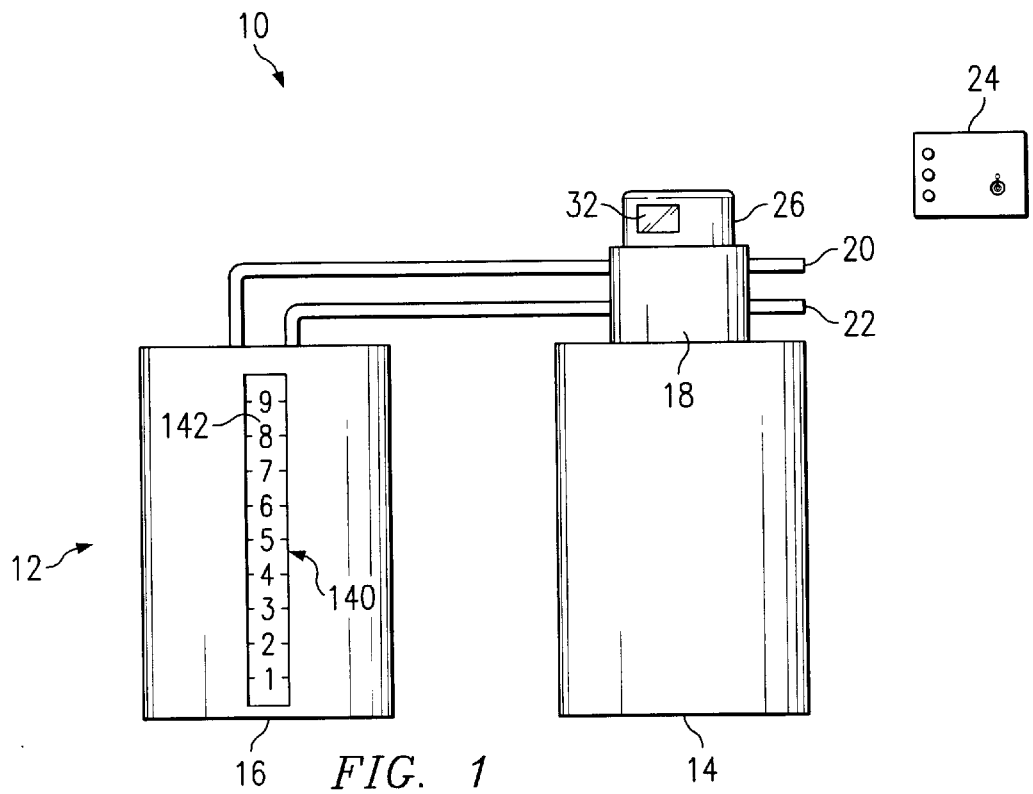
FIG. 1 is a perspective view of a water softener and a system for monitoring the status of the water softener in accordance with the present invention.

FIG. 1 shows a perspective view of the present system 10 for monitoring the status of a water softener 12. The water softener 12 includes a resin tank 14 and brine tank 16. A control valve 18 controls the flow of water into and out of the resin tank 14 and brine tank 16. Untreated water is supplied to an inlet 20. Treated water is supplied by the resin tank 14 via an outlet 22. A water softener status indicator 24 is also shown in FIG. 1.

Figure 2:
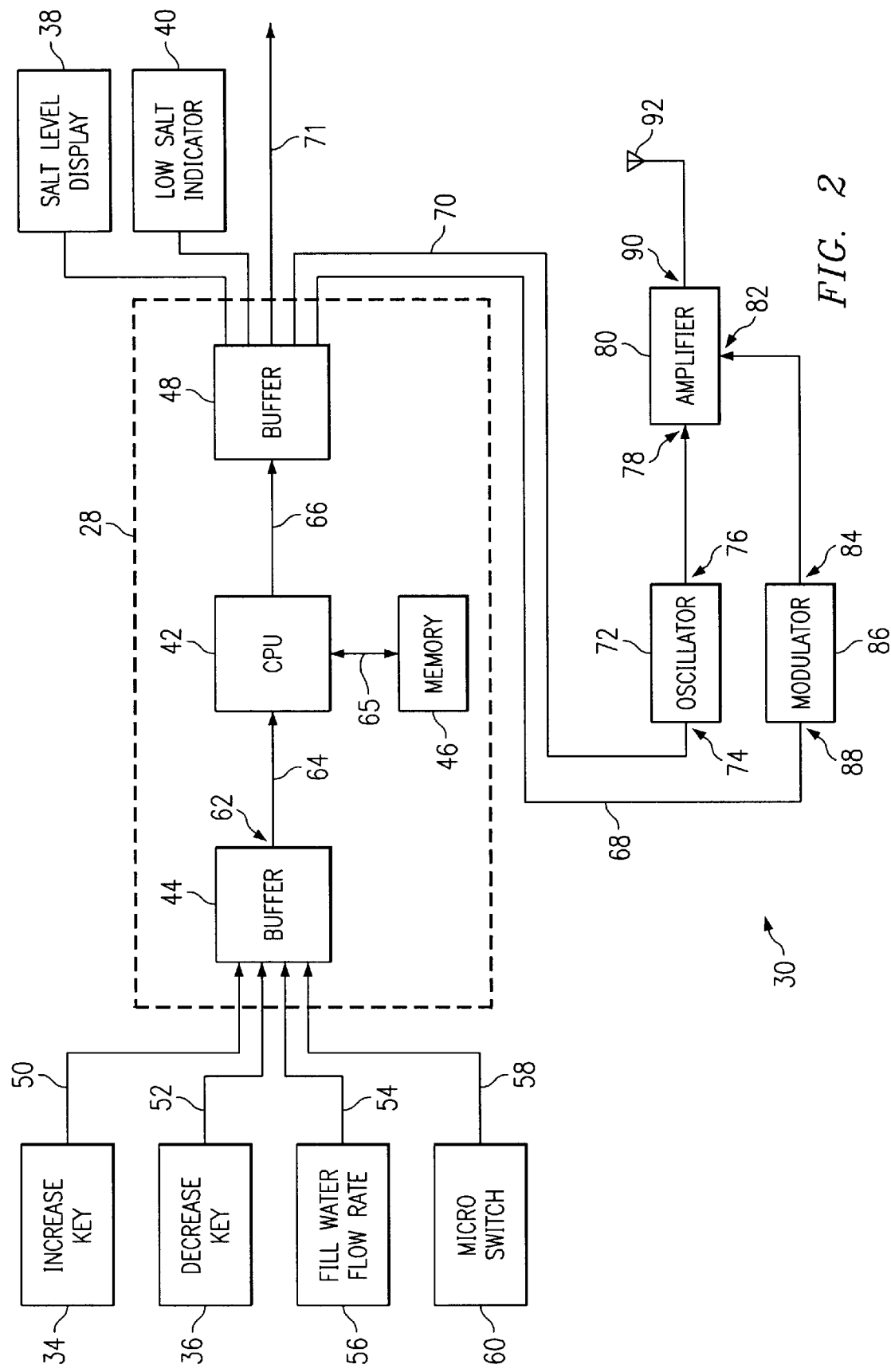
FIG. 2 is a block diagram of the water softener controller and the transmitter of FIG. 1.

A control housing 26 is located on the water softener as seen in FIG. 1. The control housing 26 includes a display panel 32, a controller 28 and a transmitter 30 as shown in FIG. 2. The display panel 32 includes the increase key 34 and decrease key 36 of FIG. 2, which are used for entering the amount of solid material or salt available in the brine tank 16. The display panel 32 further includes the salt level display 38 and low salt indicator 40 of FIG. 2.

FIG. 2 shows that the controller 28 includes a central processing unit (CPU) 42, an input buffer 44, memory 46 and an output buffer 48. The input buffer 44 includes an input 50 coupled to the increase key 34, an input 52 coupled to the decrease key 36, an input 54 coupled to a fill water flow rate 56, an input 58 coupled to a micro switch 60, and an output 62 coupled to the CPU 42 via a line 64. The CPU 42 is coupled to the memory 46 via line 65. The CPU 42 is also coupled to the output buffer 48 via line 66. The output buffer 48 includes a data output 68, enabled output 70, and motor control output 71.

The transmitter 30 includes an oscillator 72 having an input 74 coupled to the enabled output 70 and an output 76 coupled to an input 78 of an amplifier 80. The amplifier 80 has an input 82 coupled to an output 84 of a modulator 86. The modulator 86 has an input 88 coupled to the data output 68. The amplifier 80 has an output 90 coupled to an antenna 92. The transmitter 30 receives a message in digital form from the controller 28. The message is modulated to a 418 MHz signal by turning the oscillator 72 on and off.

Figure 3:
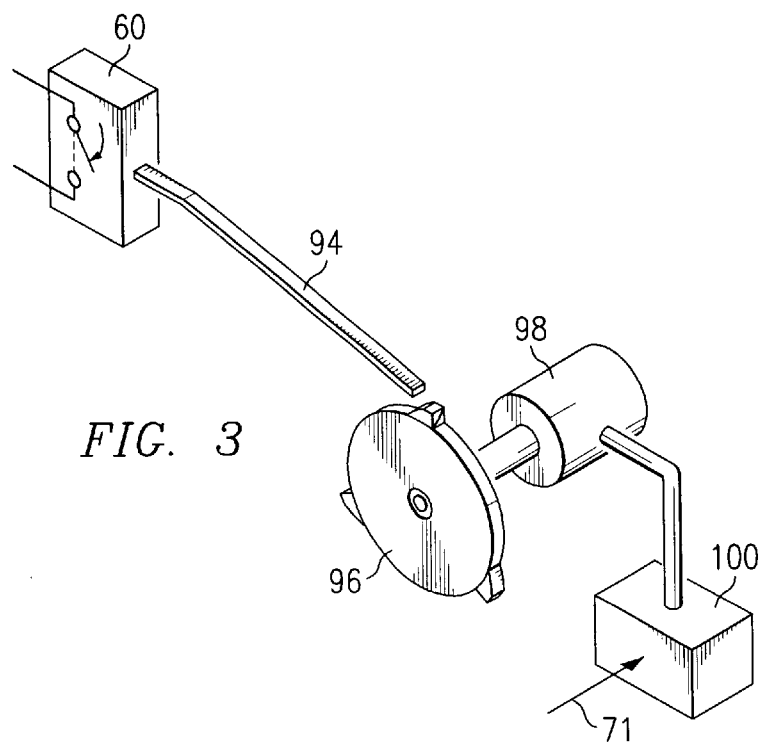
FIG. 3 is a schematic representation of a switch of the control valve of FIG. 1.

FIG. 3 illustrates the micro switch 60 that operates the control valve 18 which controls the flow of water in the tank. The micro switch 60 includes an arm 94 which toggles the switch 60 between an open circuit position and a closed circuit position each time the switch arm 94 is toggled. The switch arm 94 is in physical contact with a cam 96 of the control valve 18. The cam 96 is driven by a control valve motor 98. The motor 98 is driven by a motor interface 100 which is coupled to the controller's output buffer 48 via the motor control output 71.

Figure 4:
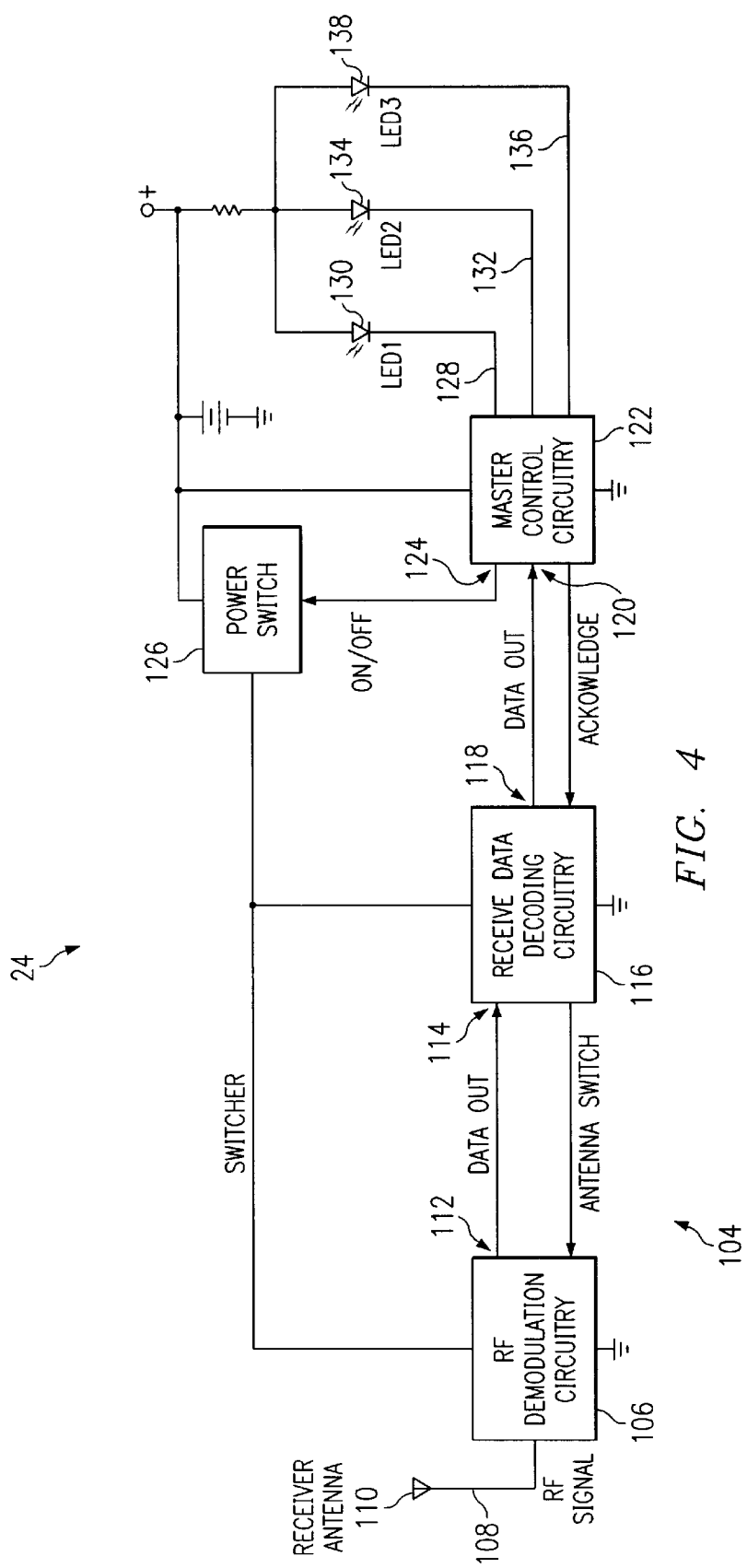
FIG. 4 is a block diagram of the water softener status indicator of FIG. 1.

FIG. 4 shows a block diagram of the water softener status indicator 24. The status indicator 24 is a stand alone device that operates at a distance from the water softener 12. The status indicator 24 is battery operated and mounted in a plastic case. The status indicator 24 may be moved to any convenient location as long as there is good signal reception.

The status indicator 24 includes a receiver 104 which includes an RF demodulator circuit 106 having an input 108 coupled to a receiver antenna 110 and a data output 112 coupled to an input 114 of a receiver data decoding circuit 116. The data decoding circuit 116 includes an output 118 coupled to an input 120 of a master control circuit 122. The master control circuit 122 provides an output 124 which is coupled to a power switch 126 to control the power sent to the RF demodulator circuit 106 and the data decoding circuit 116. The master control circuit 122 also includes an output 128 coupled to a first light emitting diode (LED) 130, an output 132 coupled to a second LED 134 and an output 136 coupled to a third LED 138. The first LED may be green and when illuminated indicates normal water softener operation. The second LED may be amber and when illuminated indicates that the amount of salt has fallen below a predetermined level. The third LED may be red and when illuminated indicates that the water softener needs service.

The controller 28 is capable of determining the level of salt in the brine tank. When a user adds salt to the brine tank, the user may determine the level of salt by examining the transparent window 140 having indicia 142 (FIG. 1). The manner in which the level of salt is determined is not as important as determining an accurate level of salt. The user adjusts the level of salt indicated by the salt level display 38 by adjusting the increase key 34 and decrease key 36 until the level displayed by salt level display 38 corresponds to the level indicated via the transparent window 140. Thereafter, each time the water softener enters a regeneration cycle, the controller 28 monitors the fill water flow rate 56 to determine how much water is being added to the brine tank 16 and consequently how much salt is being used. Each time the controller 28 determines the amount of salt being used, the amount of salt displayed on the salt level display 38 is adjusted. The memory 46 includes a predetermined level of salt representing a minimum desired amount of salt in the brine tank 16. Upon detecting that the salt has fallen below the predetermined minimum level, the controller 28 activates the low salt indicator 40. In addition, a low salt signal is provided at the data output 68 together with an enable signal at the enable output 70 and sent to transmitter 30. (See FIG. 2)

The controller 28 is also capable of testing the micro switch 60. During the micro switch test, the motor 98 is activated and the controller 28 anticipates when the micro switch 60 will change positions due to the cam action of the cam 96 and the arm 94. In the event the micro switch 60 does not change positions as anticipated by the controller 28, a water softener fault signal is generated at the data output 68 together with an enable signal at the enable output 70. The motor and power are also tested in this manner. In the event the test determines that the micro switch 60 changed positions but not at the time anticipated, there may be a problem with the motor 98 or motor interface 100.

Each time the controller 28 determines that the water softener is functioning properly and that the salt level is adequate, the controller will generate a normal operation signal at the data output 68 together with an enable signal at the enable output 70. However, in the event the controller 28 determines that one of the tests failed, the controller 28 will provide the appropriate signal at the data output 68 together with an enable signal at the enable output 70. (See FIG. 2) If there is more than one test which failed, the controller 28 will prioritize the failed tests and send an appropriate signal at the data output 68 corresponding to the highest priority of the failed tests, together with an enable signal at the enable output 70.

The signal at the data output 68 is coupled to the modulator 86 and modulated together with the signal from the oscillator 72. The transmitter 30 transmits the modulated signal via the antenna 92. The receiver 104 receives the signal via antenna 110. The transmitted signal is digital and consists of a series of 1's and 0's. The message is transmitted to the receiver by turning on and off a 418 MHz radio frequency (RF) signal for a specified amount of time. A "1" consists of 250 microseconds ($\mu$s) of RF signal OFF followed by 500 microseconds ($\mu$s) ON. A "0" consists of 500 $\mu$s of RF signal OFF followed by 250 $\mu$s RF signal ON. Turning the RF signal OFF during the message does not stop the signal completely but reduces the signal strength to a low enough level to be considered off. After the message is received, the RF circuitry 106 is shut down until the next message is sent.

The digital message consists of four parts. The first part of the message is the solid carrier. The solid carrier consists of a RF signal that is ON for 1250 $\mu$s. Then the message consists of a preamble of "0110." Next, a 4 bit Id code is transmitted followed by a 4 bit Data code. Finally, the Id code and the Data code are repeated to reduce the possibility of the receiver improperly decoding a message. The complete digital message lasts approximately 16,250 $\mu$s.

The Id code is derived from the serial number of the water softener. The water softener has a unique serial number that consists of approximately 32 to 48 bits that are implanted on the softener's printed wiring assembly by the manufacturer. The Id code is made up of 4 bits and is used to keep the receiver 104 from accepting a message from a different softener. Once the initial message is accepted by the receiver 104, messages with other Id code's will be ignored. The Id code also establishes the time between message transmissions. The time between transmissions is [60+0.25 (ID code in decimal format)] seconds. The value of the Id code in decimal format can vary from 0 to 15. Therefore, the time between transmissions varies from approximately 60 to 63.75 seconds in 0.25 second increments.

The Data code also consists of 4 bits. The system is configured to only accept the following data codes: "0000" which means that the system is working, "0001" which means that the salt level is low, "0010" which signifies check the system, "0011" is a test message, and "0100" is a manufacturing message. Only one Data code can be transmitted at a time so the messages are prioritized. The manufacturing message is only sent when the system is in manufacturing mode and no other messages may be sent at this time. "Check system" has the highest priority followed by "Salt level is low" and "System working." The Test mode is not accessible while the system is sending the "Check system" message but the test message takes priority over the "Salt level is low" and "System working" message.

When the system is connected, the microprocessor goes through an initialization routine. Part of the routine is to flash each LED sequentially for 0.5 second. This gives an indicia that the system is functioning normally. After start-up, the receiver 104 goes through an initialization routine and then enters a listen mode. The RF demodulator circuitry 106 is turned on for a maximum of 15 minutes. During that time, the receiver 104 listens for a valid message. As soon as it receives the valid message, it adopts the Id code. As discussed above, the receiver 104 will only accept messages with the original Id code. Any message with a different Id code will be ignored. The receiver 104 will now shut off until the next message is scheduled to be sent.

While waiting for the message the status indicator 24 flashes the appropriate LED based on the data field just received. To conserve power the LEDs flash briefly every 5 seconds. Only one of the LEDS will be on at a time. If a low salt condition exists in conjunction with an error code only the red LED will flash.

The transmitter 30 communicates with the receiver 104 of the water status indicator 24 in three different modes. One of the communication modes is the normal mode. In the normal mode, one of the LED's coupled to the master control circuit 122 flashes every five seconds. The transmitter 30 sends a message and depending on the message, one of the LED's will flash. As discussed above, in order to conserve power, the majority of the circuit is shut down via power switch 126. The power is shut down until just before a message is scheduled to be received as determined by the Id code. The receiver 104 turns on for 0.25 seconds to receive the message and then shuts down until the next message is expected.

If a signal is lost while the system is in normal mode, the receiver 104 will attempt to recover a connection by extending the amount of time it is fully powered. If the receiver 104 misses two signals, the receiver 104 will stay on for two seconds. If more than three signals are missed, the receiver 104 stays on for 70 seconds but shuts down for a longer period of time. The length of the shut down time is increased as the number of missed signals increases. The period of time the receiver 104 is shut off can extend up to 24 hours when the receiver 104 has missed more than eight signals in a row.

The transmitter 30 and receiver 104 may also communicate in a test mode. The user can test the system by selecting the test mode on the softener controller's menu and on the status indicator 24. The purpose of the test mode is to enable the user to find a location for the status indicator 24 that will provide reliable reception. During the test mode, the transmitter 30 sends a message every 3 seconds. If the status indicator 24 receives and accepts the messages, it flashes the LED's in the opposite of the start-up order and then shuts down and waits for the next message. The transmitter 30 continues to send test messages for about 15 minutes unless the user turns off the test mode. The transmitter 30 sends one normal message returning the system back to normal mode.

If a signal is lost in the test mode, the receiver 104 will flash the red LED twice in rapid succession. The receiver 104 than shuts down and waits for the next valid message. This process will continue for two minutes or until the receiver 104 receives a valid message. If the receiver 104 does not receive a valid message, the system will shut down completely until it is restarted.

The transmitter 30 and receiver 104 also communicate in a manufacturing mode. The transmitter 30 sends the manufacturing message every second continuously until it exits from the first stage. When the receiver 104 receives a valid manufacturing message it flashes the LED's in the same order as the test mode.

If a signal is lost in the manufacturing mode, the receiver 104 will not turn on any of the LED's. Instead the receiver 104 will shut down and wait for the next valid message. This process will continue for two minutes or until the receiver 104 receives a valid message. If the receiver 104 does not receive a valid message, the system will shut down completely until it is restarted.

While preferred embodiments of the present invention have been illustrated and described, it will be understood by those of ordinary skill in the art that changes and modifications can be made without departing from the invention in its broader aspects. Various features of the present invention are set forth in the following claims.

What is claimed:

1. A system for monitoring the status of a water softener, the system comprising:
   a water softener controller;
   a water softener control valve that controls the flow of water in the water softener;
   the water softener controller having means for determining the status of the water softener including whether or not the water softener is operating properly,
   said means for determining having a switch coupled to the controller and indicating the position of the water softener control valve, said determining means monitoring said switch to determine whether said water softener is operating properly;
   a water softener transmitter, the water softener transmitter coupled to the water softener controller and having means for transmitting the status of the water softener; and
   a water softener status indicator, the water softener status indicator having a means for receiving from the water softener transmitter the transmitted status of the water softener, and means for displaying the status of the water softener.

2. The system of claim 1, wherein the water softener transmitter includes an oscillator tuned to a transmitting frequency, the water softener status indicator includes a receiver, the receiver being tuned to the transmitting frequency.

3. The system of claim 2, wherein the water softener controller generates an oscillator enable signal, the water softener controller includes an enable output which provides the oscillator enable signal, the transmitter oscillator includes an enable input, the enable input is coupled to the enable output of the water softener controller, the oscillator being enabled with the oscillator enabled signal provided by the water softener controller.

4. The system of claim 2, wherein the water softener controller generates data indicating the status of the water softener, the water softener controller having a data output which provides the status data, the transmitter includes a modulator, the modulator having a data input, the data input is coupled to the data output of the water softener controller, whereby the modulator receives the status data via the data output.

5. The system of claim 1, wherein the switch having an open circuit position and a closed circuit position, the position of the switch corresponds to the position of the water softener control valve.

6. The system of claim 5, wherein the status determining means includes means for determining the position of the switch, and means for determining whether the switch changes position as anticipated, the controller generating a water softener fault signal if the switch does not change position as anticipated.

7. The system of claim 5, wherein the status determining means includes means for determining whether the switch changes position within a predetermined time, the controller generating a water softener fault signal if the switch does not change position within the predetermined time.

8. The system of claim 7, wherein the controller includes means for developing the water softener fault signal at the controller data output and an enable signal at the enable output, whereby the water softener fault signal is transmitted via the water softener transmitter.

9. The system of claim 5, wherein the status determining means includes means for determining whether the salt level of the water softener is below a predetermined level, the controller generating a low salt signal if the salt level is below the predetermined level.

10. The system of claim 9, wherein the controller includes means for developing the low salt signal at the controller data output, and an enable signal at the enable output, whereby the low salt signal is transmitted via the water softener transmitter.

11. The system of claim 1, wherein the status displaying means includes a means for indicating that the water softener is operating normally, means for indicating that the water softener salt level is below a predetermined level and means for indicating that the water softener needs service.

12. The system of claim 11, wherein each of the indicating means is a light emitting diode.

* * * * *